United States Patent
Dancer et al.

(10) Patent No.: US 8,649,522 B2
(45) Date of Patent: Feb. 11, 2014

(54) ELECTRONIC DATA COMMUNICATION SYSTEM

(75) Inventors: Andrew John Dancer, Shenington (GB); Mark Chimley, Gloucestershire (GB)

(73) Assignee: Trend Micro Incorporated, Tokyo (JP)

( * ) Notice: Subject to any disclaimer, the term of this patent is extended or adjusted under 35 U.S.C. 154(b) by 898 days.

(21) Appl. No.: 12/295,982

(22) PCT Filed: Apr. 3, 2007

(86) PCT No.: PCT/GB2007/001220
§ 371 (c)(1),
(2), (4) Date: Nov. 2, 2009

(87) PCT Pub. No.: WO2007/113547
PCT Pub. Date: Oct. 11, 2007

(65) Prior Publication Data
US 2010/0046757 A1  Feb. 25, 2010

(30) Foreign Application Priority Data
Apr. 3, 2006  (GB) .................................. 0606686.4

(51) Int. Cl.
*H04L 9/00*  (2006.01)
(52) U.S. Cl.
USPC ............................ 380/277; 709/206; 713/168
(58) Field of Classification Search
USPC ............................ 380/277; 709/206; 713/168
See application file for complete search history.

(56) References Cited

U.S. PATENT DOCUMENTS

| | | | |
|---|---|---|---|
| 6,625,734 B1 | 9/2003 | Marvit et al. | |
| 6,904,521 B1 * | 6/2005 | Jivsov | 713/155 |
| 2004/0236953 A1 * | 11/2004 | Merenne et al. | 713/182 |
| 2005/0138353 A1 | 6/2005 | Spies et al. | |
| 2007/0183600 A1 * | 8/2007 | Smart | 380/286 |

FOREIGN PATENT DOCUMENTS

| | | |
|---|---|---|
| EP | 1646194 A1 | 4/2006 |
| FR | 2839406 A | 11/2003 |
| JP | 11340965 A | 12/1999 |

OTHER PUBLICATIONS

N. McCullagh, "Securing e-mail with identity-based encryption," IT Professional, May-Jun. 2005, vol. 7, Issue 3, pp. 64, 61-63.

* cited by examiner

*Primary Examiner* — Jung Kim
*Assistant Examiner* — Ayoub Alata
(74) *Attorney, Agent, or Firm* — Okamoto & Benedicto LLP

(57) ABSTRACT

There is described an electronic mail messaging system in which a plurality of user computers are connected to a mail registration server via the Internet. The mail registration server stores plural sets of decryption data, each set being required to decrypt a corresponding encrypted electronic mail message. Following receipt of an encrypted electronic mail message, a user computer communicates with the mailed registration server to effect decryption of the encrypted electronic mail message using the corresponding decryption data stored by the mail registration server. In this way, the accessing of the electronic mail message can be monitored by the mail registration server.

16 Claims, 9 Drawing Sheets

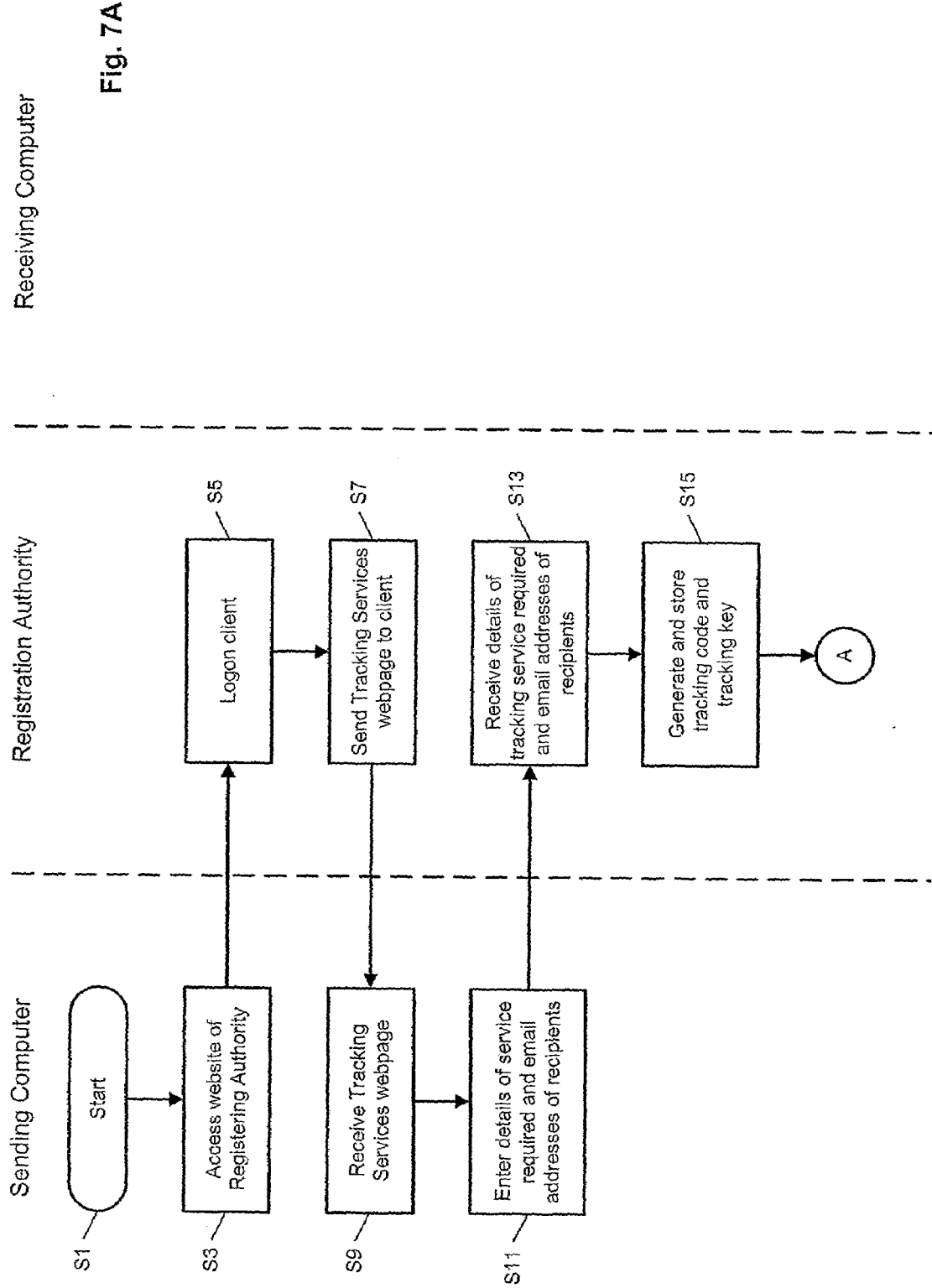

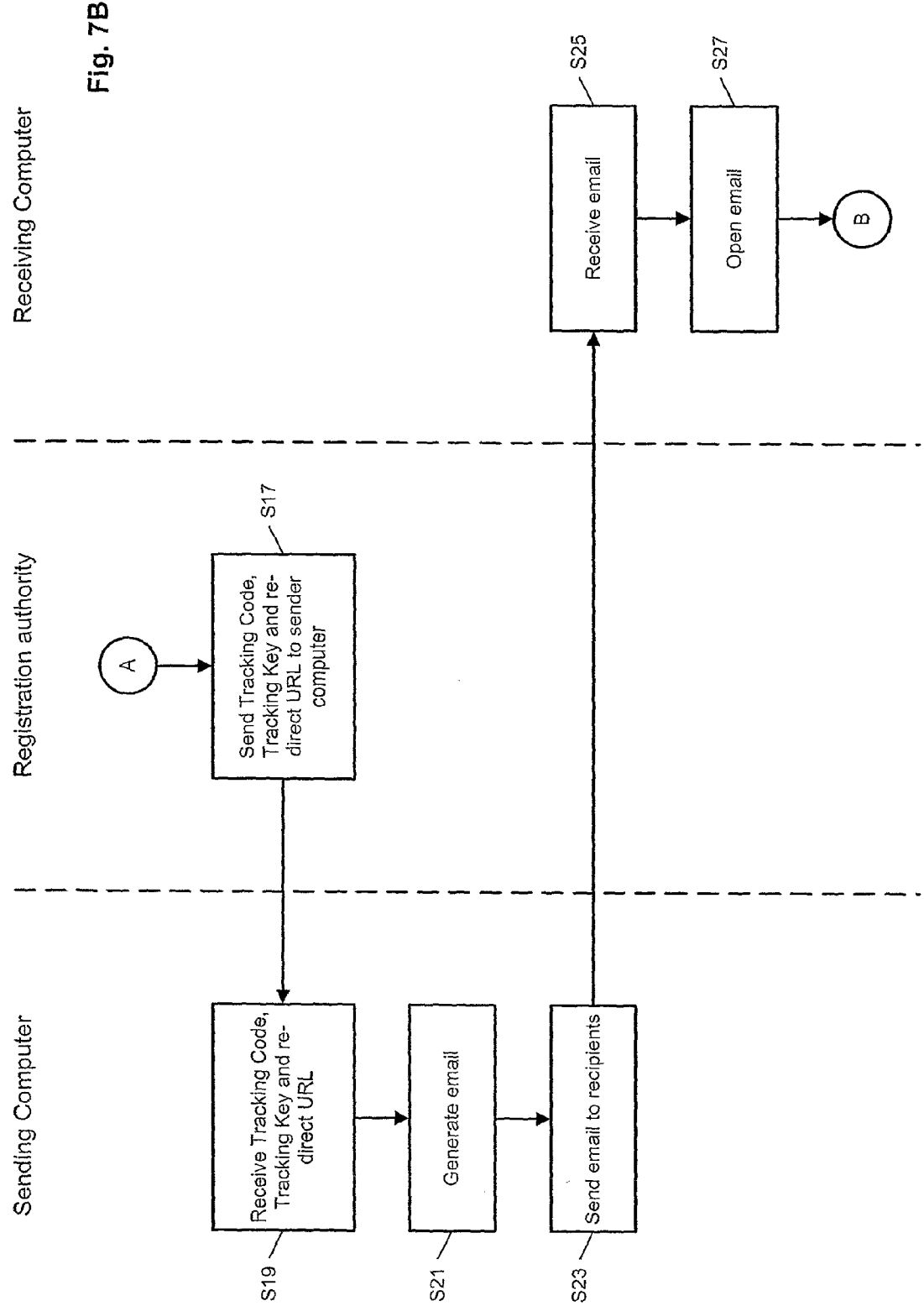

ELECTRONIC DATA COMMUNICATION SYSTEM

Figure 1:
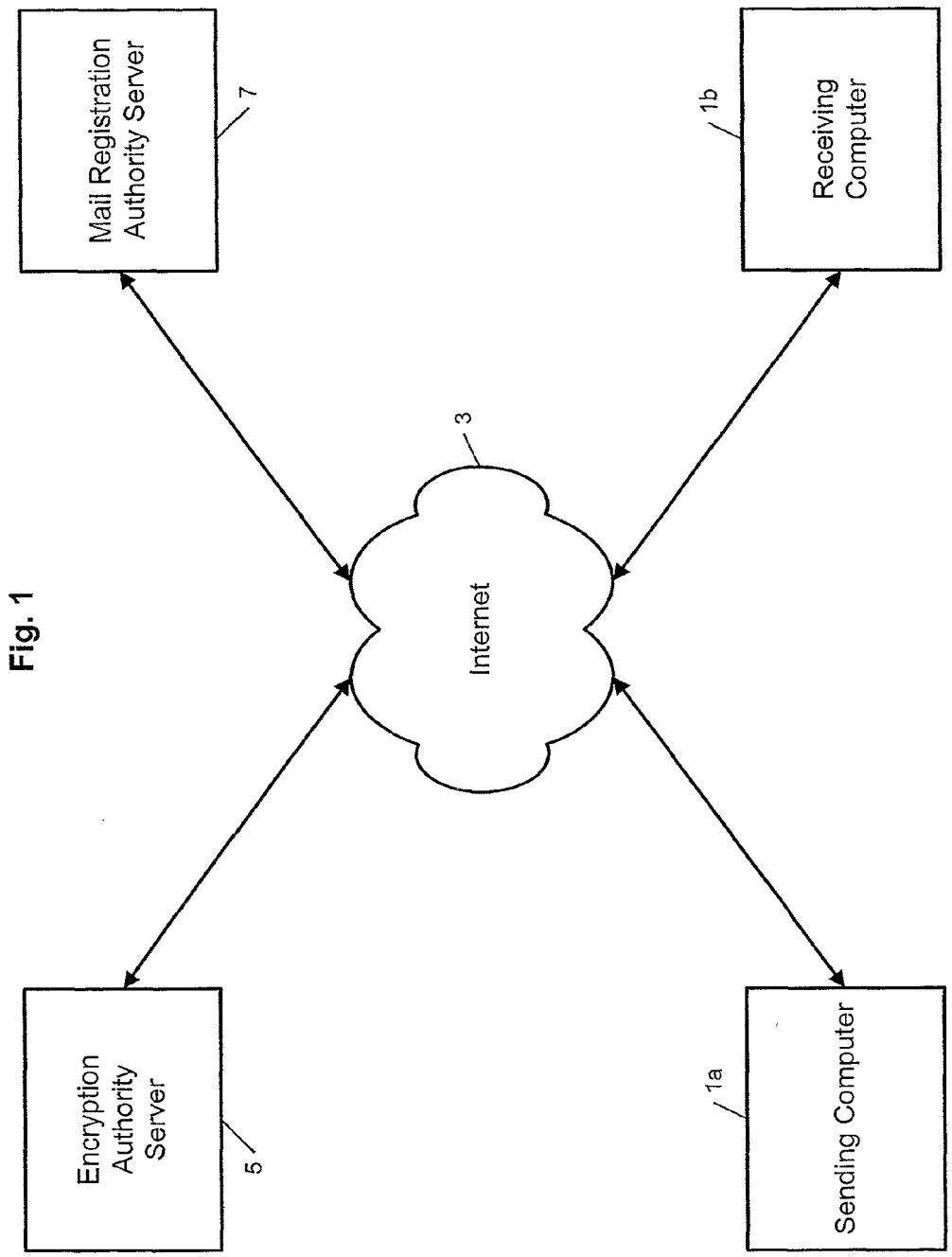

This invention relates to an electronic data communication system and components of the electronic data communication system. The invention has particular relevance to a system for sending mail messages to and receiving mail messages from a person electronically.

Electronic mail messaging involves an electronic mail message being sent to an electronic mail address which directs the electronic mail message to a virtual mailbox. The use of such electronic mail messaging is becoming more and more widespread, predominantly using email programs such as Microsoft Outlook. A problem with conventional email programs is that sent emails may be intercepted and read.

There have been proposals to encrypt electronic mail messages using public key cryptography in which an asymmetric encryption algorithm is used. In particular, a public key associated with the recipient of an electronic mail message is used by the sender to encrypt the message. The resultant encrypted message can only be decrypted using a private key which is different from a public key, with access to the private key being controlled by the recipient of the message.

As well as ensuring that a message is only read by a desired recipient, public key cryptography also enables the author of a message and the message content to be verified. In particular a digital signature can be added to the message, the digital signature being formed by signing a one-way hash of the message using the private key of the sender. The recipient of the message is then able to generate a one-way hash of the received message and verify the identity of the sender and the content of the message using the digital signature and the public key of the sender.

The asymmetric encryption algorithms utilised in public key cryptography are slow in comparison with symmetric encryption algorithms in which the same cryptographic key is used for encryption and decryption. This problem has previously been addressed for electronic mail messaging by employing a so-called KEM-DEM approach in which an encrypted electronic mail message is formed by a Key Encapsulation Mechanism (KEM) part storing a session key (which is unique to the message) encrypted using the public key of the recipient, and a Data Encapsulation Mechanism (DEM) part storing the electronic mail message encrypted by a symmetric encryption algorithm using the session key stored in the KEM part as the cryptographic key. In this way, the amount of encryption and decryption performed by the asymmetric encryption algorithm is reduced.

In certain circumstances, it is desirable to know when a message has been received and accessed. There is a technical problem in how to obtain such confirmation for encrypted emails. The present invention provides a novel and advantageous solution to this problem.

According to the present invention, there is provided an electronic mail messaging system in which a plurality of user computers are connected to a mail registration server via the internet. The mail registration server stores plural sets of decryption data, each set being required to decrypt encrypted encryption data associated with a corresponding encrypted electronic mail message. Following receipt of an encrypted electronic mail message, a user computer communicates with the mail registration server to effect decryption of the encrypted encryption data using the corresponding decryption data stored by the mail registration server. In this way, the accessing of the electronic mail message can be monitored by the mail registration server. Furthermore, the decryption data is for converting encrypted encryption data for an encrypted electronic mail message not for decrypting the encrypted electronic mail message itself. Thus, the mail registration server does not have the decryption data for the encrypted electronic mail message.

Figure 2:
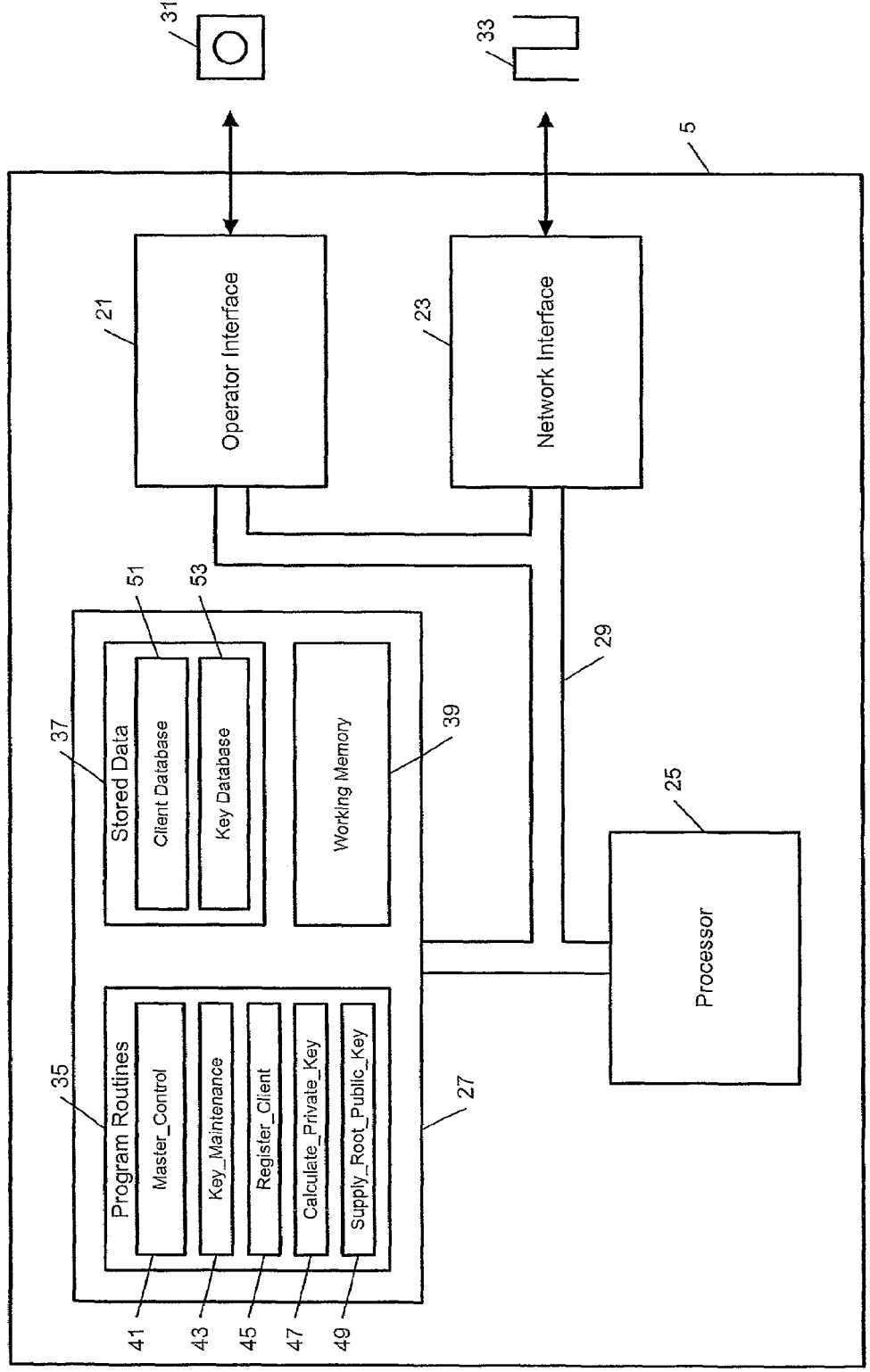
Figure 3:
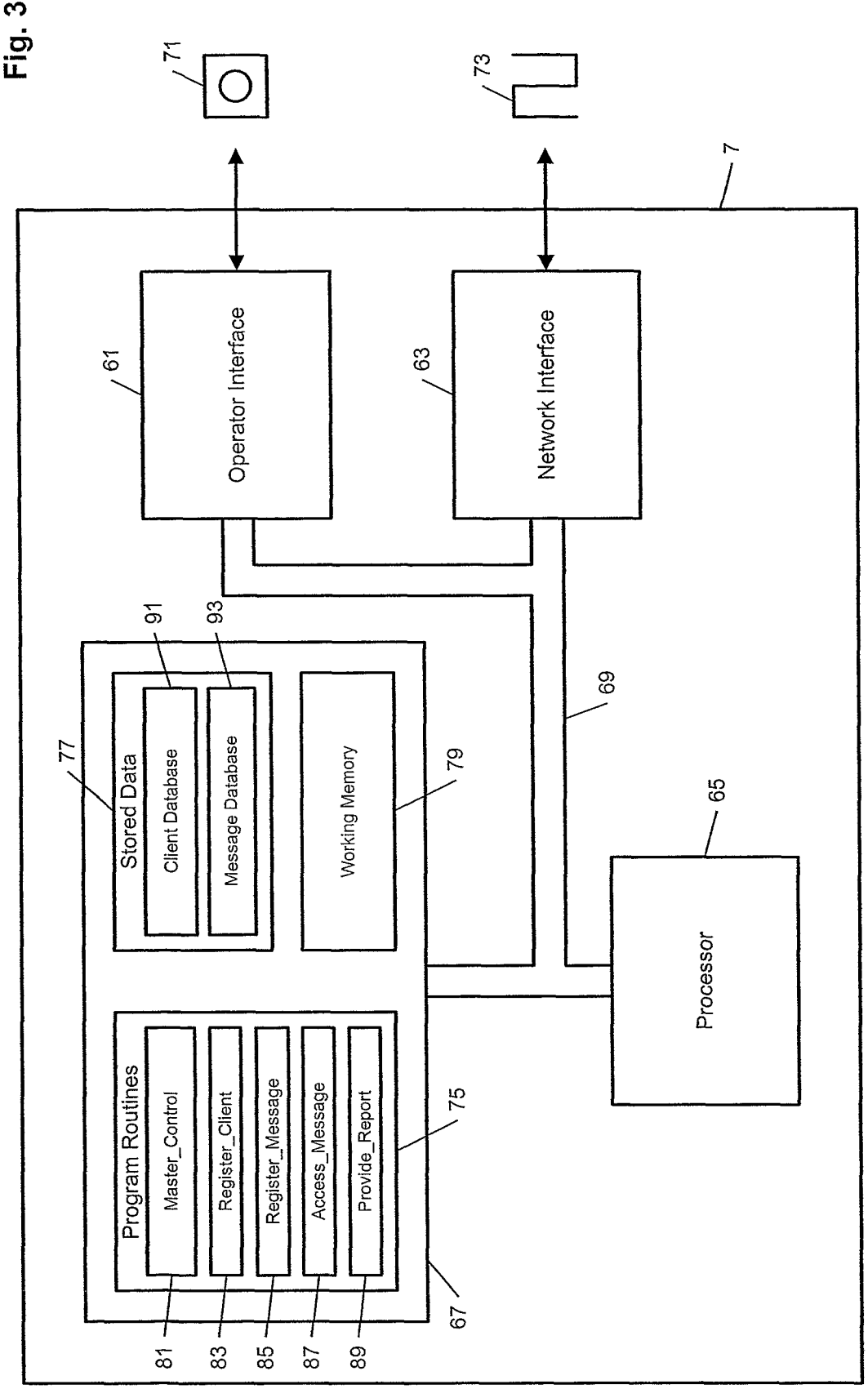
Figure 4:
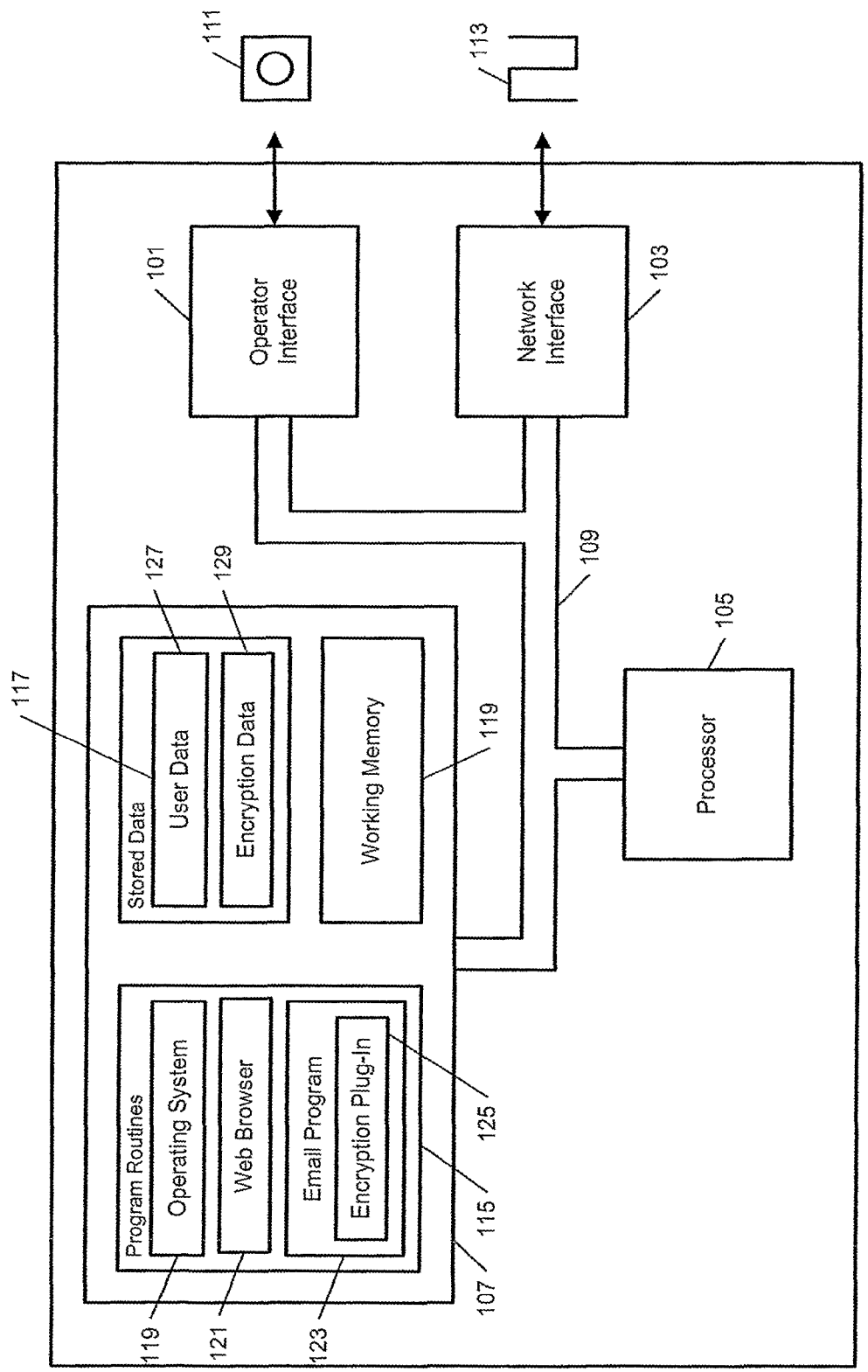
Figure 5:
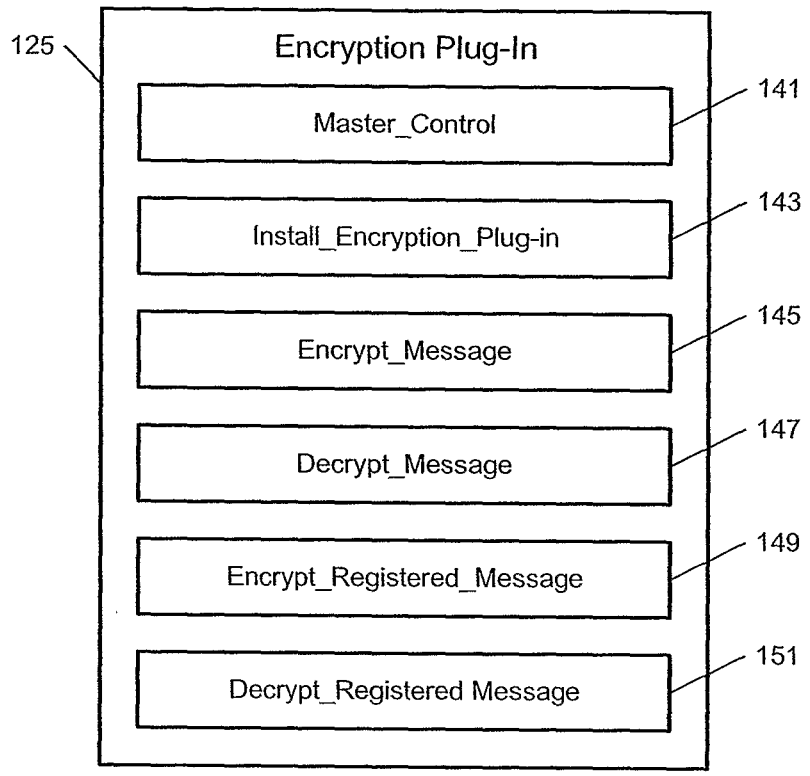
Figure 6:
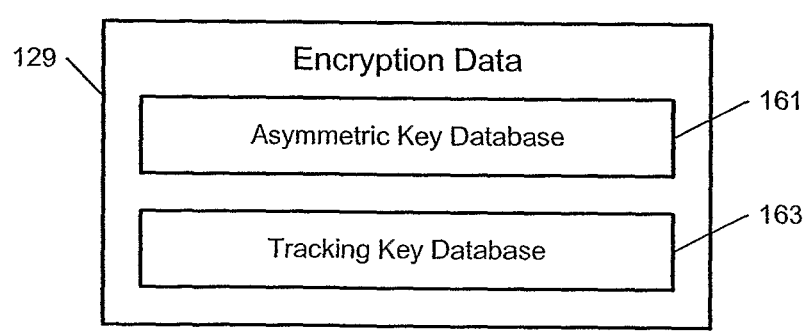
Figure 7C:
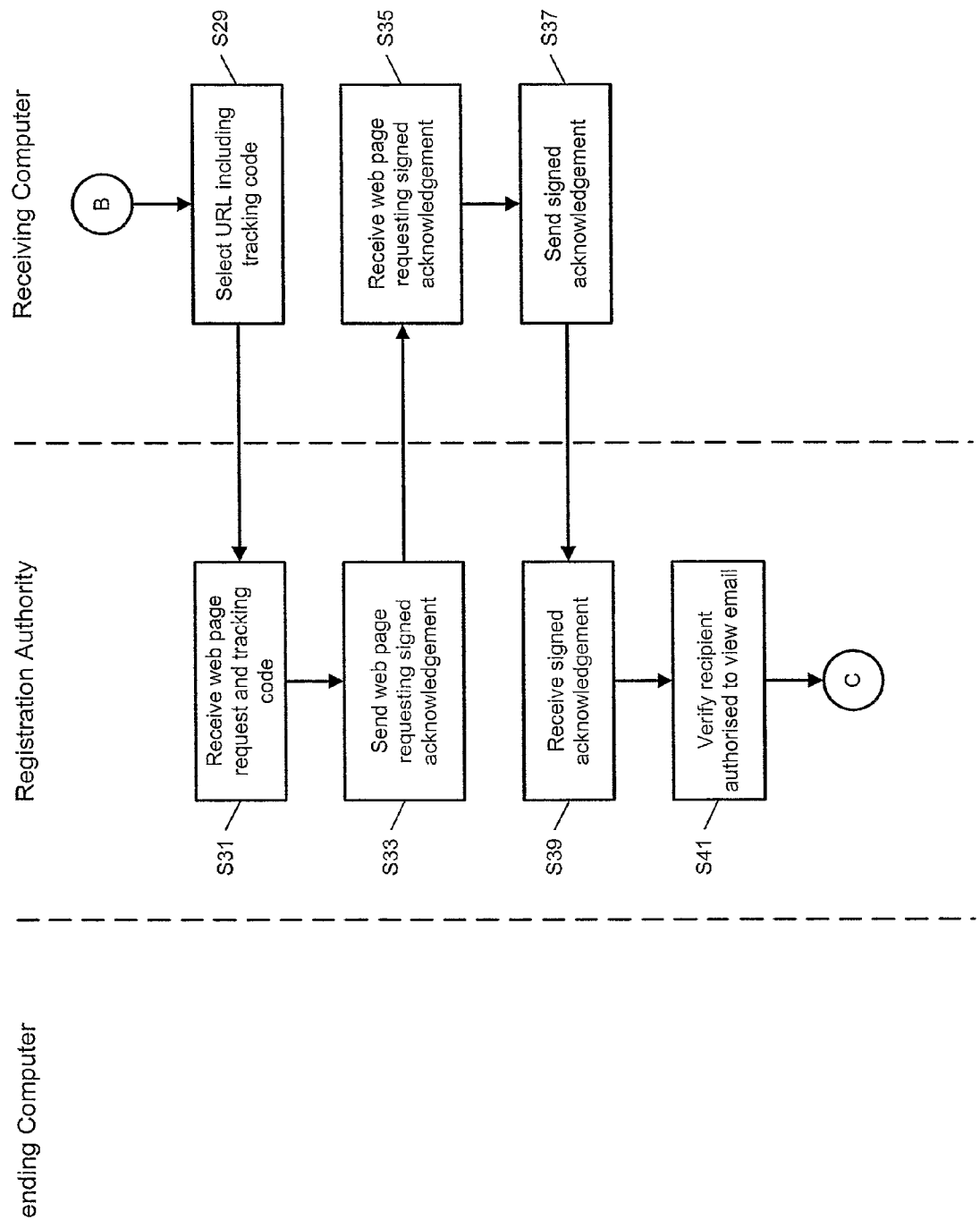
Figure 7D:
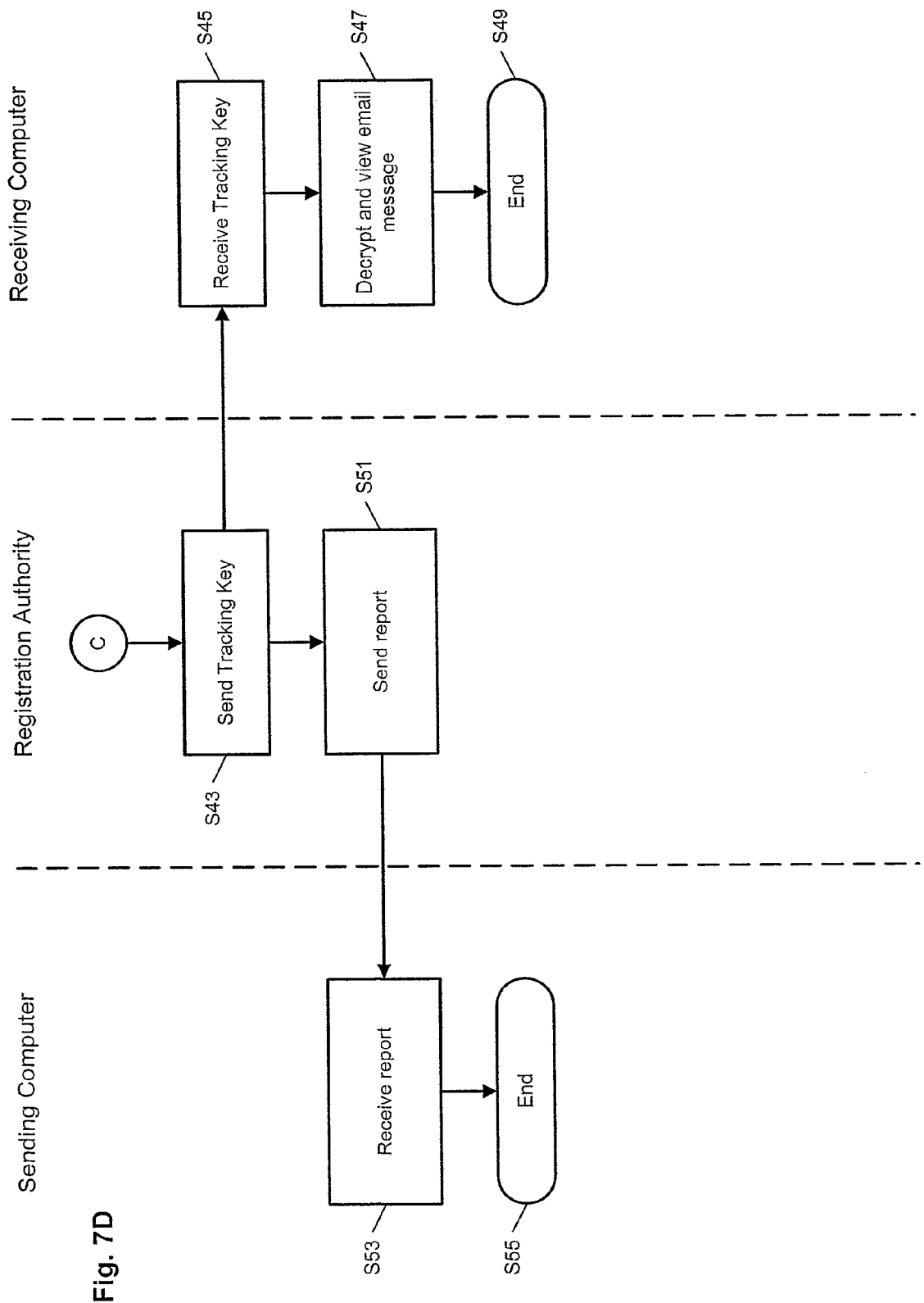

An exemplary embodiment of the present invention will now be described with reference to the accompanying figures in which:

FIG. 1 schematically shows the main components of an electronic mail messaging system according to the invention;

FIG. 2 schematically shows the main components of an encryption authority server forming part of the electronic mail messaging system illustrated in FIG. 1;

FIG. 3 schematically shows the main components of a mail registration authority server forming part of the electronic mail messaging system illustrated in FIG. 1;

FIG. 4 schematically shows the main components of a user computer forming part of the electronic mail messaging system illustrated in FIG. 1;

FIG. 5 schematically shows the main program routines of an encryption plug-in to an email program forming part of the user computer illustrated in FIG. 4;

FIG. 6 schematically shows a map of data associated with the encryption plug-in which is stored in the user computer illustrated in FIG. 4; and FIGS. 7A to 7D show a flow chart schematically indicating the main steps performed to send an encrypted registered email from a sender to a recipient in the electronic mail messaging system illustrated in FIG. 1.

SYSTEM OVERVIEW

As shown in FIG. 1, in the illustrated embodiment an electronic mail messaging system has a plurality of user computers, of which only a sending computer $1a$ and a receiving computer $1b$ are shown for ease of illustration connected to the Internet 3. An encryption authority server 5 and a mail registration authority server 7 are also connected to the Internet 3.

The encryption authority server 5 provides cryptographic keys to the user computers 1. In particular, in this embodiment the encryption authority server 5 issues a public key certificate providing a root public key $K^G_{pub}$ for the encryption algorithm described in WO 03/017559, the whole contents of which is incorporated herein by reference. According to this encryption algorithm, the public key $K^c_{pub}$ for a client having an electronic mail address "client_ID" is given by:

$$K^c_{pub} = F(\text{client\_ID}, K^G_{pub})$$

where F is a publicly available function. In this way, the public key $K^c_{pub}$ associated with a client can be calculated by anyone knowing the email address of the client, the root public key $K^G_{pub}$ of the encryption authority and the function F (all of which are publicly available).

The private key associated with a client can only be calculated with knowledge of the root private key $K^G_{pri}$, which is kept secret by the encryption authority administering the encryption authority server 5. In particular, the private key $K^c_{pri}$ for a client having an electronic mail address "client_ID" is calculated by the encryption authority server 5 in accordance with the relation:

$$K^c_{pri} = G(\text{client\_ID}, K^G_{pri})$$

where G is a function which is paired with F.

Throughout the remainder of this description, unless otherwise indicated reference to data being asymmetrically encrypted using a public key means that the data is encrypted using the asymmetric encryption algorithm described in WO 03/017559 with the public key forming the cryptographic key, and similarly reference to data being asymmetrically decrypted using a private key means that the data is decrypted using the asymmetric encryption algorithm described in WO 03/017559 with the private key forming the cryptographic key.

Reference will also be made throughout the description to data being symmetrically encrypted or decrypted using a symmetric key. Unless otherwise indicated, this refers to encryption or decryption of the data using the Advanced Encryption Standard (AES) algorithm using the symmetric key as the cryptographic key.

In this embodiment, when the sending computer $1a$ is used to send an email to a recipient associated with the receiving computer $1b$, a modification of the KEM-DEM approach is employed in which a tracking key from the mail registration authority server 7 must be downloaded by the recipient of the message in order to recover the session key which is required to decrypt the DEM-part of the message. In particular, when sending a message the sender registers the message with the mail registration authority server 7, and the mail registration authority server 7 sends a tracking code and a tracking key to the sender. The sender uses the tracking key to generate the encrypted message, and sends the tracking code along with the encrypted message. On receiving the encrypted message, the recipient sends the tracking code and proof of identity to the mail registration authority server 7, which in reply sends the tracking key required to decrypt the message to the recipient.

The encryption authority server 5, the mail registration authority server 7 and the user computers 1 will now be described in more detail.

The Encryption Authority Server

As shown in FIG. 2, the encryption authority server 5 has an operator interface 21, a network interface 23, a processor 25 and a memory 27 interconnected by a bus system 29.

The operator interface 21 includes a keyboard (not shown) for an operator to enter data into the encryption authority server 5 and a display (not shown) for allowing the operator to read data produced by the encryption authority server 5. The operator interface 21 also includes a CD-ROM reader-writer (not shown) via which data stored on a CD-ROM 31 can be input into the encryption authority server 5 or data produced by the encryption authority server 5 can be written onto a recordable CD-ROM 31.

The network interface 23 receives data from and outputs data to the Internet 3 in the form of network signals 33.

The processor 25 performs processing operations in accordance with program routines stored in the memory 27. These program routines may be either stored during manufacture, or input to the encryption authority server 5 via the operator interface 21 or the network interface 23. The program routines process data stored in the memory 27 and data received by the encryption authority server 5 via the operator interface 21 and the network interface 23.

The memory 27 is formed by different types of memory having respectively different access times, and conventional processing techniques are employed to improve the speed of processing by caching data likely to be required into fast access time memory in advance.

The memory 27 includes a region 35 storing program routines used by the encryption authority server 5, a region 37 storing data and a region 39 providing working memory.

In particular, the program routines memory region 35 stores:
 a Master_Control routine 41;
 a Key_Maintenance sub-routine 43;
 a Register_Client sub-routine 45;
 a Calculate_Private_Key sub-routine 47; and
 a Supply_Root_Public_Key sub-routine 49.

The stored data memory region 37 stores:
 a client database 51; and
 a key database 53.

The Master_Control routine 41 co-ordinates the operations of the encryption authority server 5. This includes executing the sub-routines when required.

It will be appreciated that the security of the user private keys is reliant on the root private key $K^G_{pri}$ remaining secret. As a precautionary measure, in this embodiment the Key_Maintenance sub-routine is periodically executed to generate new core public and private keys which are stored in the key database 53 along with the old public and private keys. In particular, the key database 53 stores data indicating for core public and private key pairs and for each pair the time period for which that pair was active.

The Register_Client sub-routine 45 is initiated by the Master_Control sub-routine 41 in response to a registration request received by a prospective client. The Register_Client sub-routine 45 stores data relating to the client in the client database 51, uses the Calculate_Private_Key sub-routine 45 to calculate a client private key using the currently active core private key $K^G_{pri}$ and the email address for the client and supplies the calculated client private key to the client. Subsequently, whenever the Key_Maintenance sub-routine 43 generates a new core private key $K^G_{pri}$, the Key_Maintenance sub-routine 43 uses the Calculate_Private_Key sub-routine 47 to calculate the new client private key for each client based on the new core private key.

The Supply_Root_Public_Key sub-routine 49 is initiated by the Master_Control routine 41 in response to a request for a root public key $K^G_{pub}$, and supplies a public key certificate for the requested root public key $K^G_{pub}$.

The Mail Registration Authority Server

As shown in FIG. 3, the mail registration authority server 7 has an operator interface 61, a network interface 63, a processor 65 and a memory 67 interconnected by a bus system 69.

The operator interface 61 includes a keyboard (not shown) for an operator to enter data into the mail registration authority server 7 and a display (not shown) for allowing the operator to read data produced by the mail registration authority server 7. The operator interface 61 also includes a CD-ROM reader-writer (not shown) via which data stored on a CD-ROM 71 can be input into the mail registration authority server 7 or data produced by the mail registration authority server 7 can be written onto a recordable CD-ROM 71.

The network interface 63 receives data from and outputs data to the Internet 3 in the form of network signals 73.

The processor 75 performs processing operations in accordance with program routines stored in the memory 67. These program routines may be either stored during manufacture, or input to the mail registration authority server 7 via the operator interface 61 or the network interface 63. The program routines process data stored in the memory 67 and data received by the mail registration authority server 7 via the operator interface 61 and the network interface 63.

The memory 67 is formed by different types of memory having respectively different access times, and conventional processing techniques are employed to improve the speed of processing by caching data likely to be required into fast access time memory in advance.

The memory 67 includes a region 75 storing program routines used by the mail registration authority server 7, a region 77 storing data and a region 79 providing working memory.

In particular, the program routines memory region 75 stores:
- a Master_Control routine 81;
- a Register_Client routine 83;
- a Register_Message sub-routine 85;
- an Access_Message sub-routine 87; and
- a Provide_Report sub-routine 89.

The stored data memory region 77 stores:
- a client database 91; and
- a message database 93.

The client database stores details for each client including the client name, email address, logon password and account details. The message database stores details for each registered message including the client who sent the message, a unique tracking code for the message, the type of registration service, the recipients of the message, a tracking key, and information identifying when each recipient retrieves the tracking key.

The Master_Control routine 81 controls the operation of the mail registration authority server, using the sub-routines when needed.

The Register_Client sub-routine 83 is initiated by the Master_Control routine 81 in order to register details of a new client in the client database 91. The remaining sub-routines will be discussed in detail later.

The User Computers

The main components of a user computer 1, such as the sending computer 1a and the receiving computer 1b, will now be described with reference to FIGS. 4 to 6.

As shown in FIG. 4, a user computer 1 has an operator interface 101, a network interface 103, a processor 105 and a memory 107 interconnected by a bus system 109.

The operator interface 101 includes a keyboard (not shown) for an operator to enter data into the user computer 1 and a display (not shown) for allowing the operator to read data produced by the user computer 1. The operator interface 101 also includes a CD-ROM reader-writer (not shown) via which data stored on a CD-ROM 111 can be input into the user computer 1 or data produced by the user computer 1 can be written onto a recordable CD-ROM 111.

The network interface 103 receives data from and outputs data to the Internet 3 in the form of network signals 113.

The processor 105 performs processing operations in accordance with program routines stored in the memory 107. These program routines may be either stored during manufacture, or input to the user computer 1 via the operator interface 101 or the network interface 103. The program routines process data stored in the memory 107 and data received by the mail user computer 1 via the operator interface 101 and the network interface 103.

The memory 107 is formed by different types of memory having respectively different access times, and conventional processing techniques are employed to improve the speed of processing by caching data likely to be required into fast access time memory in advance.

The memory 107 includes a region 115 storing program routines used by the user computer 1, a region 117 storing data and a region 119 providing working memory.

In particular, among other programs the program routines memory region 107 stores:
- a conventional operating system 119 such as Microsoft Windows;
- a conventional web browser 121 such as Microsoft Internet Explorer; and
- an email program 123 including an encryption plug-in 125.

Among other data, the stored data memory region stores:
- user data 127 storing user registration details associated with the mail registration server; and
- encryption data 129 storing data associated with the encryption plug-in 125.

FIG. 5 shows in more detail the program routines of the encryption plug-in 125. As shown, the encryption plug-in 125 includes:
- a Master_Control routine 141;
- an Install_Encryption_Plug-in sub-routine 143;
- an Encrypt_Message sub-routine 145;
- a Decrypt_Message sub-routine 147;
- an Encrypt_Registered_Message sub-routine 149; and
- a Decrypt_Registered_Message sub-routine 151.

FIG. 6 shows in more detail the encryption data 129. As shown, the encryption data 129 includes:
- an asymmetric keys database 161; and
- a tracking key database 163.

The asymmetric keys database 161 stores user public key and private key pairs, with each key pair being stored in association with the corresponding core public key $K^G_{pub}$ and the time period for which the key pair and associated core public key was active.

The transfer key database 163 stores a table listing for each email registered with the mail registration authority server 7 the corresponding tracking code and tracking key.

The Master_Control routine 141 controls the operations of the encryption plug-in 141, using the sub-routines as required. The Install_Encryption_Plug-in sub-routine is used when the user of the computer first registers with the encryption authority server 5, and stores the initial user private key and public key pair in the key database 161. The Master_Control routine 141 also controls the updating of the user public key and private key pairs required due to the updating of the core public key and private key pair by the encryption authority server 5.

The Encrypt_Message sub-routine 145 is used when the user of the user computer 1 wishes to send an unregistered encrypted message. The Encrypt_Message sub-routine 145 generates a random session key for the message, and then symmetrically encrypts the message using the generated session key to form the DEM-part of the encrypted message. The Encrypt_Message sub-routine 145 then calculates the public key associated with each recipient for the message (using the email address of the recipient and the core public key $K^G_{pub}$) and for each recipient asymmetrically encrypts the session key using the public key for that recipient. The Encrypt_Message sub-routine 145 then combines the resultant set of encrypted session keys with an encrypted session key formed by the session key encrypted using the public key associated with the sender (i.e. the user of the computer) to form the KEM-part of the encrypted message. The Encrypt_Message sub-routine 145 then combines the KEM-part and the DEM-part to form the encrypted message.

The Decrypt_Message sub-routine 147 is used to decrypt an unregistered encrypted email. The Decrypt_Message sub-routine 147 extracts from the KEM-part of the encrypted email the encrypted session key which was encrypted using the public key for the user of the computer. The Decrypt_Message sub-routine 147 then retrieves from the key database 161 the user private key which was active at the time the message was sent, and asymmetrically decrypts the extracted encrypted session key using the retrieved user private key to recover the session key. The Decrypt_Message sub-routine 147 then decrypts the DEM-part of the received encrypted message using the recovered session key, and displays the decrypted message to the user.

Further details of the Encrypt_Message sub-routine 145 and the Decrypt_Message sub-routine 147 may be found in WO 2005/050908, the whole contents of which are hereby incorporated herein by reference.

Sending/Reading Registered Encrypted Emails

The sending and reading of a registered encrypted email will now be described with reference to FIGS. 7A-7D.

When a user of the sending computer 1a wishes to send a registered encrypted email, the user starts, at S1, by selecting a registered email menu option provided by the encryption plug-in 125. In response to the selection of the registered email menu option, the Master_Control routine 141 of the encryption plug-in 125 initiates the Encrypt_Registered_Message sub-routine 149.

The Encrypt_Registered_Message sub-routine 149 starts by establishing a https link with the mail registration authority server 7 and downloading, using the web browser 121, a logon web page provided by the mail registration authority server 7. The user then enters user identification and password information in the logon web page and sends the logon information to the mail registration authority server 7.

On receiving the logon information, the Master_Control routine 81 of the mail registration server 67 verifies, at S5, the logon information using the data in the client database 91 and then initiates the Register_Message sub-routine 85. The register message sub-routine 85 sends a tracking services web page which provides a list of available tracking services together with their associated costs. The tracking services web page also gives the amount currently held in the client account and includes data entry boxes for entering the email addresses of the desired recipients of the email.

In this embodiment, the only available tracking service is a "sign before reading" service which requires a recipient to digitally sign to acknowledge receipt prior to being able to view an electronic mail message.

After receiving, at S9, the tracking services web page, the user of the sending computer 1a enters, at S11 the desired tracking service and the desired recipients of the email and then sends the entered information to the mail registration authority server 7. On receiving, at S13, the tracking service and recipient email addresses information, the mail registration authority server 7 generates, at S15, a unique tracking code for the email and a tracking key (which in this embodiment is a binary number) for the email, and creates a new entry in the message database 93 for the email storing the tracking code, the tracking key, the list of recipient email addresses and the tracking service selected. The mail registration authority server 7 then sends, at S17, the tracking code, tracking key and a uniform resource locater (URL) to be accessed by each recipient to the sending computer 1. This ends the Register_Message sub-routine 85.

On receiving, at S19, the tracking code, tracking key and URL from the mail registration authority server 7, the sending computer generates, at S19, the encrypted registered email. In particular, the sending computer 1a first generates a session key (which in this embodiment is a binary number) for the email and encrypts the message using the generated session key to form the DEM-part of the encrypted message. The sending computer 1a then generates an intermediate key by performing a bitwise exclusive-OR function on the tracking key and the session key. The Encrypt_Registered_Message sub-routine 149 then calculates the public key associated with each recipient for the message (using the email address of the recipient and the core public key $K^G_{pub}$) and for each recipient asymmetrically encrypts the intermediate key using the public key for that recipient. The Encrypt_Registered_Message sub-routine 149 then combines the resultant set of encrypted intermediate keys with an encrypted intermediate key formed by the intermediate key encrypted using the public key associated with the sender (i.e. the user of the computer) and header information including the URL and tracking code to form the KEM-part of the encrypted message. The Encrypt_Registered_Message sub-routine 149 then forms the encrypted registered email by combining the KEM-part and the DEM-part and a non-encrypted message portion indicating that the email is encrypted.

The sending computer 1a then sends, at S23, the encrypted registered email to the recipients. The Encrypt_Registered_Message sub-routine 149 then ends.

After a receiving computer 1b receives, at S25, the encrypted registered message and the user of the receiving computer 1b opens, at S27, the encrypted registered email, the non-encrypted message portion is displayed. The user of the receiving computer 1b then selects, at S29, a decrypt email menu option provided by the encryption plug-in software. In response to selection of the decrypt email menu option, the receiving computer reads the header information in the KEM part and identifies that the tracking key must be accessed from the mail registration server. The receiving computer 1b then accesses the URL in the header portion of the KEM-part using the web browser 121 and conveys the tracking code and the email address of the recipient at the receiving computer 1b to the mail registration server 7.

When the mail registration authority server 7 receives, at S31, a signal conveying the URL including the tracking code and the recipient email address, the mail registration authority server 7 establishes an HTTPS link with the receiving computer 1b. The mail registration authority server 7 then initiates the Access_Message sub-routine 87 which sends, at S33, a verify identity web page to the receiving computer 1b. The verify identity web page requests the user of the receiving computer to send back an acknowledgement message with a digital signature generated using the private key for the user of the receiving computer 1b.

On receiving, at S35, the verify identity web page the user of the receiving computer 1b responds by sending, at S37, the requested signed acknowledgement.

On receiving the signed acknowledgement, the mail registration authority server 7 verifies, at S41, the identity of the user of the receiving computer 1b using the public key for the user in a conventional manner and checks in the entry in the message database 93 associated with the tracking code that the user of the receiving computer 1b is indeed one of the recipients of the email. As discussed previously, in this embodiment the user public key may be calculated using the email address for the user of the receiving computer 1b and the core public key $K^G_{pub}$.

After verifying that the user of the receiving computer 1b is one of the recipients of the email, the mail registration authority server 7 retrieves the tracking key from the entry in the message database 93 associated with the tracking code, and sends, at S43, the retrieved tracking key to the receiving computer 1b. The mail registration authority server 7 also updates the entry in the message data indicating the time at which the user of the receiving computer 1b downloaded the tracking key. The Access_Message sub-routine 87 then ends.

On receiving, at S45, the tracking key, the receiving computer 1b initiates the Decrypt_Registered_Message sub-routine 151 which decrypts, at S47, the registered encrypted email for viewing. In particular, the receiving computer 1b extracts from the KEM-part of the encrypted registered email the encrypted intermediate key which was encrypted using the public key for the user of the receiving computer 1b. The receiving computer 1b then retrieves from the key database 161 the user private key which was active at the time the message was sent, and asymmetrically decrypts the extracted encrypted intermediate key using the retrieved user private key to recover the intermediate key.

The receiving computer 1*b* then performs a bitwise exclusive-OR function on the recovered intermediate key and the received tracking key which, as will be appreciated by those skilled in the art, recovers the session key. The receiving computer 1*b* then decrypts the DEM-part of the received encrypted message using the recovered session key, and displays the decrypted message to the user. The Decrypt_Registered_Message sub-routine 151 then ends at S49.

In this embodiment, after the Access_Message sub-routine 87 has ended, the Provide_Report sub-routine 89 is initiated which sends, at S51, a report to the user of the sending computer 1*a* indicating the time at which the user of the receiving computer 1*b* downloaded the tracking key. After the user of the sending computer has received, at S53, the report, the process ends at S55.

MODIFICATIONS AND FURTHER EMBODIMENT

In the illustrated embodiment, the user of the receiving computer 1*b* is already registered with the encryption authority server 5, and accordingly has a user private key. It will be appreciated that as a public key for a recipient can be calculated by anyone using the email address of the recipient and the core public key $K^G_{pub}$, encrypted emails can also be sent to recipients who are not already registered with the encryption authority server. However, if someone who is not registered with the encryption authority server 5 receives an encrypted email, then they must register with the encryption authority server 5 in order to obtain the user private key needed to decrypt the encrypted email. In a preferred embodiment, the non-encrypted message portion of the encrypted email includes details of how to register with the encryption authority server 5 to facilitate registration. These details may include a URL which directs to a registration web page provided by the encryption authority server.

In the illustrated embodiment, there is only a single mail registration authority which runs a single mail registration encryption authority server. Alternatively, there may be plural mail registration encryption authorities with each mail registration encryption authority having a respective server. If this is the case, the illustrated embodiment may be modified so that when the registered email menu option is selected a list of available mail registration encryption authorities is presented. In a preferred embodiment this list is accessed from the Internet so that it could be easily updated. Conveniently, the list of mail registration authorities could be accessed from the encryption authority server.

It is possible for an encrypted email to be registered with plural mail registration authorities. For example, the intermediate key could be formed using a commutative mathematical operation on the session key, a first tracking key from a first mail registration authority server and a second tracking key from a second mail registration authority server. In this way, the session key can be recovered only after the first and second tracking keys have been recovered from the first and second mail registration authorities respectively.

In the illustrated embodiment, the tracking service provided requires a recipient of an email to provide a digital signature before being able to read the email. Using a digital signature provides a high level of proof of the identity of the recipient but requires a significant amount of processing. However, such a high level of proof is not required in all applications. In such applications, the requirement for a digital signature may be removed so that the tracking key is simply provided to the recipient of the encrypted registered email on request. This still allows the originator of the encrypted registered email to know that the email has been accessed. It will be appreciated that different tracking rules may be adopted for different recipients of an encrypted registered email.

In the illustrated embodiment, a report is issued by the mail registration authority server each time a recipient successfully downloads a tracking key. It will be appreciated that there is no need for any automatic report. Alternatively, reports could be automatically issued when all recipients have successfully downloaded the tracking key, or when one or more recipients have not downloaded the tracking key within a predetermined time, or a report could be issued after a predetermined time indicating which recipient had successfully downloaded the tracking key by that time.

One application where the use of the encrypted registered emails provided by the invention is useful is the distribution of bank statements or bills such as, for example, credit card bills. One advantage of registering this distribution is that information on whether bank statements or bills are being read is useful for providing an early indication of whether the recipient is in financial difficulty. In particular, it has been found that if a person is in financial difficulty then that person will often not open bank statements and bills.

The illustrated embodiment could also be modified so that the mail registration authority server only downloaded the tracking key after a predetermined time. In this way, encrypted registered emails could be sent out in advance but could only be read after a predetermined time. In order to do this, the entry in the message database of the mail registration server specifies a date and time information indicating a time before which the tracking key can not be downloaded, and when the mail registration server receives a request for the tracking key the mail registration server checks with a real time clock providing date and time information whether the time before which the tracking key may not be downloaded has passed.

Such a timed release of the tracking key is useful if large documents need to be published to many parties simultaneously. One application where such timed release could be used is in the publication by email of company financial reports.

It will be appreciated that in the illustrated embodiment, knowledge of the private key of a recipient is not in itself sufficient to decrypt an encrypted registered email. Decryption data (i.e. in the illustrated embodiment the tracking key) stored in the mail registration authority server 7 must also be accessed. The mail registration authority server 7 can therefore monitor accessing of the encrypted registered email by monitoring accessing of the associated decryption data, allowing in effect an audit trail to be recorded. In an embodiment, the audit trail is preserved to keep track of all the people who have accessed the encrypted registered email.

If the private key of a recipient is compromised, then although the third party having knowledge of the recipient private key can use the recipient private key to derive a digital signature and therefore impersonate the recipient, the audit trail kept by the mail registration authority server 7 may include indicators of the compromising of the recipient private key. For example, the audit trail may indicate accesses of the decryption data from different network addresses. In a preferred embodiment, the mail registration authority server 7 monitors the audit trails for indicators that a recipient private key may have been compromised, and on detecting an indicator warns the owner of the potentially compromised private key.

In the illustrated embodiment, the encrypted registered email has a non-encrypted portion and an encrypted portion. It will be appreciated that the encrypted portion could be one or more files attached to the email, and that non-encrypted files could also be attached to the email. In an embodiment, separate tracking keys and tracking codes are provided for a plurality of encrypted files attached to an email so that accessing of individual ones of the attached encrypted files can be monitored.

It will be appreciated that once an email has been received at a user computer, the encrypted portion of the email is stored as one or more encrypted files on the user computer. It is not essential that the encrypted files are communicated from the sender by email, although sending by email has the advantage of inherently linking the encrypted file or files to the email recipients. However, using the KEM-DEM approach also inherently links an encrypted file to one or more intended recipients, and therefore when the KEM-DEM approach is used the encrypted file could be communicated using forms of network file transfer other than emails (for example utilising the FTP protocol), or may even be communicated as an encrypted file stored on a hardware storage device such as a CD-ROM.

In the illustrated embodiment, a bitwise exclusive-OR operation is performed on the tracking key and the session key to determine an intermediate key which is asymmetrically encrypted in the KEM-part, and a bitwise exclusive-OR operation is performed on the intermediate key and the tracking key to recover the session key. Alternatively, the session key could be asymmetrically encrypted and a bitwise exclusive-OR operation performed on the result and the tracking key to determine the data stored in the KEM-part.

It will be appreciated that other mathematical functions could link the tracking key, the intermediate key and the session key. For example, the intermediate key could be formed by symmetrically encrypting the session key using the tracking key as the cryptographic key, with the session key being recovered by symmetrically decrypting the intermediate key using the tracking key as the cryptographic key.

In the illustrated embodiment, a single tracking key is issued for all recipients of the registered email. It will be appreciated that in an alternative embodiment different tracking keys could be issued for different recipients, so that there will be different intermediate keys associated with different users.

In the illustrated embodiment, the mail registration authority server 7 sends the tracking key to the receiving computer 1b, and the receiving computer 1b derives the session key from the intermediate key and the tracking key. In an alternative embodiment, the receiving computer 1b sends the intermediate key to the mail registration authority server 7, the mail registration authority server 7 derives the session key using the intermediate key and the tracking key, and then sends the derived session key to the receiving computer. This allows the mail registration server to have control over the mathematical function linking the tracking key, the intermediate key and the session key.

Although KEM/DEM type emails are used in the illustrated embodiments, this is not essential. In an alternative embodiment, the sending computer symmetrically encrypts the mail message using a session key and sends the session key to the mail registration authority server. In order to decrypt the message a recipient must download the session key from the mail registration authority server, and this downloading of the session key is monitored.

In the illustrated embodiment, the encryption authority server generates a root private key and root public key pair. This generation involves some form of random number generation so that the generated keys are not predefined. Once the root private key is generated, the user private keys can be calculated from the root private key and some form of identifier for the user. Similarly, once the root public key is generated the user public keys can be calculated from the root public key and the identifier for the user. In particular, calculation of the user private and public keys does not require any random number generation and it is a repeatable calculation yielding the same result each time whenever and wherever it is performed.

In the illustrated embodiment, the electronic mail address for the user is used as the identifier of the user. Other forms of identifier could be used, but the electronic mail address is convenient because the sender will always have knowledge of the electronic mail address for the recipient in order to send an electronic mail message to a recipient.

As described above, the sender can calculate the public key for a recipient using the electronic mail address for the recipient and the root public key. Accordingly, there is no necessity to verify the authenticity of the public key for the recipient (for example by a public key certificate), although the root public key will normally form part of a public key certificate containing information for confirming the authenticity of the root public key in a conventional manner.

In the illustrated embodiment, the asymmetric encryption algorithm discussed in WO 03/017559 is used. It will be appreciated that alternative algorithms with the same overall functionality could be used, for example the algorithm discussed in "ID based cryptosystems with pairing on elliptic curve" by R. Sakai and M. Kasahara, Cryptology ePrint archive, Report 2003/054 and the algorithm discussed in "An Efficient ID-KEM Based On the Sakai-Kasahara Key Construction" by Chen et al, Cryptology ePrint archive, Report 2005/224 (both of which publications are hereby incorporated herein by reference).

Further, the asymmetric encryption algorithm need not determine the public key for a client using the client identity, and any asymmetric encryption algorithm, for example the RSA algorithm, could be used.

In the illustrated embodiment, emails are encrypted using the respective public key for each recipient so that each recipient can decrypt the email using the respective private key. In this way, only the desired recipients can decrypt the email. It will be appreciated that additionally the email may be signed using the private key of the sender. In this way each recipient can verify that the email originated from the sender and has not been tampered with.

While in the illustrated embodiment symmetric encryption is performed using the AES encryption algorithm, it will be appreciated that other symmetric encryption algorithms could be used, for example the DES algorithm.

In the illustrated embodiment, the encryption authority server 5 and the mail registration authority server 7 both include web servers which allow information to be communicated in the form of web pages to the user computers 1 which use conventional web browser programs incorporated in the user computers 1 to present the web pages on respective displays. It will be appreciated that other data communication techniques could be used involving structured data transfer, for example utilising XML files. In some embodiments, the user computers may include proprietary client software to enable communication with one or both of the encryption authority server and the mail registration authority server.

In the illustrated embodiment, the user computers are conventional personal computers. It will be appreciated that such personal computers may be, for example, of the laptop or desktop variety. Further, the user computer could be formed by other types of computer apparatus such as a thin client or a personal digital assistant (PDA).

Although the illustrated embodiment of the invention comprises computer apparatus and processes performed in the computer apparatus, the invention also extends to computer programs, particularly computer programs on or in a carrier, adapted for putting the invention into practice. The program may be in the form of source code, object code, a code intermediate source and object codes such as in a partially compiled form, or in any other form suitable for using the implementation of the processes according to the invention.

The carrier may be any entity or device capable of carrying the program. For example, the carrier may comprise a storage medium, such as a ROM, for example a CD-ROM or a semiconductor ROM, or a magnetic recording medium, for example a floppy disk, or a hard disk. Further, the carrier may be a transmissible carrier such as an electronic or optical signal which may be conveyed via electrical or optical cable or by radio or other means.

When the program is embodied in a signal which may be conveyed directly by cable or other device or means, the carrier may be constituted by such cable or other device or means. Alternatively, the carrier may be an integrated circuit in which the program is embedded, the integrated circuit being adapted for performing, or for use in the performance of, the relevant processes.

Although in the described embodiments the invention is implemented using software, it will be appreciated that alternatively the invention could be implemented using hardware devices, or a combination of hardware devices and software.

The invention claimed is:

1. A system for communicating an electronic mail message to a recipient, the system comprising:
    a network having network devices connected thereto, the network devices including a mail registration server and a plurality of user computers,
    wherein encryption data for encrypting an electronic mail message into an encrypted electronic mail message is encrypted to form encrypted encryption data and the mail registration server is operable to store a tracking key required to decrypt the encrypted encryption data, the tracking key being employed in a user computer associated with a sender of the electronic mail message to generate an intermediate key,
    wherein a user computer associated with a recipient of the encrypted electronic mail message is operable, following receipt of the encrypted electronic mail message, to:
        (a) send the mail registration server a digital signature generated using a private key of the recipient before being able to receive the tracking key from the mail registration server,
        (b) receive the tracking key from the mail registration server,
        (c) decrypt the encrypted encryption data using the private key of the recipient to form the intermediate key,
        (d) use the tracking key received from the mail registration server to convert the intermediate key to a session key, and
        (e) use the session key to decrypt the encrypted electronic message,
    wherein the mail registration server is operable, following receipt and verification of the digital signature generated using the private key of the recipient, to provide the tracking key to the user computer associated with the recipient.

2. A system according to claim 1, wherein the mail registration server stores the tracking key together with a list of recipients for the encrypted, electronic mail message, and wherein in response to receipt of a request for access to the tracking key, the mail registration server is operable to verify that the request originated from one of the recipients for said encrypted electronic mail message.

3. A system according to claim 1, wherein the mail registration server is operable to calculate a public key of the recipient using identification information associated with the recipient.

4. A system according to claim 3, wherein said identification information comprises the electronic mail address for the sender of the request.

5. A system according to claim 1, wherein the encrypted electronic mail message comprises: encrypted message data corresponding to a message for the recipient symmetrically encrypted using the session key; and encrypted encryption data corresponding to the intermediate key encrypted by an asymmetric encryption algorithm using a public key associated with the recipient, wherein said tracking key stored by the mail registration server for the encrypted electronic message allows conversion of the intermediate key into the session key.

6. A system according to claim 5, wherein the intermediate key and said tracking key are binary numbers, and wherein recovery of said session key comprises performing a bitwise exclusive-OR operation on the intermediate key and said tracking key.

7. A system according to claim 1, wherein the mail registration server is operable to inhibit transmission of said tracking key for an electronic mail message prior to a specified time.

8. A system according to claim 1, wherein in response to receipt of a request for access to the tracking key, the mail registration server is operable to transmit said tracking key to the sender of the request.

9. A system according to claim 1, wherein in response to a request from the user computer associated with the sender of the electronic mail message, the mail registration server is operable to transmit the tracking key to the user computer associated with said sender.

10. A network device comprising:
    a network interface operable to send data to and receive data from remote network devices including a remote mail registration server; and
    a processor operable, following receipt of an encrypted electronic mail message by the network device, to:
        (a) send to the remote mail registration server before being able to decrypt the encrypted electronic mail message a request identifying the encrypted electronic mail message and including a digital signature generated using a private key associated with a recipient of the encrypted electronic mail message,
        (b) receive a tracking key from the remote mail registration server, the tracking key being employed in a user computer associated with a sender of the electronic mail message to generate an intermediate key,
        (c) decrypt encrypted encryption data using a private key associated with a recipient of the encrypted electronic mail message to form an intermediate key, (d) use the tracking key received from the remote mail registration server to convert the intermediate key to a session key, and (e) use the session key to decrypt the encrypted electronic mail message.

11. A network device according to claim 10, wherein the encrypted electronic mail message comprises: encrypted message data corresponding to a message for the recipient symmetrically encrypted using the session key; and the encrypted encryption data corresponding to the intermediate key encrypted by an asymmetric encryption algorithm using a public key associated with the recipient, wherein said processor is operable to convert said intermediate key into said session key using the received tracking key.

12. A network device according to claim 11, wherein the intermediate key and said tracking key are binary numbers, and wherein the processor is operable to perform a bitwise exclusive-OR operation on the intermediate key and said tracking key.

13. A method of communicating an electronic mail message to a recipient over a network having network devices connected thereto, the network devices including a mail registration server and a plurality of user computers, the method comprising:

the mail registration server storing a tracking key required to decrypt encrypted encryption data associated with an encrypted electronic mail message and employed in a user computer associated with a sender of the electronic mail message to generate an intermediate key, verifying a digital signature of a recipient of the encrypted electronic mail message before providing the tracking key to a user computer associated with the recipient, and following receipt of the encrypted electronic mail message, a user computer associated with the recipient
 (a) generating the digital signature using a private key associated with the recipient,
 (b) providing the digital signature to the mail registration server before being able to decrypt the encrypted electronic mail message,
 (c) receiving the tracking key from the mail registration server,
 (d) decrypting the encrypted encryption data using the private key associated with the recipient to form the intermediate key,
 (e) using the tracking key received from the remote mail registration server to convert the intermediate key to a session key, and
 (f) using the session key to decrypt the encrypted electronic mail message.

14. A method according to claim 13, wherein the encrypted electronic mail message comprises: encrypted message data corresponding to a message for the recipient symmetrically encrypted using the session key; and the encrypted encryption data corresponding to the intermediate key encrypted by an asymmetric encryption algorithm using a public key associated with the recipient, wherein said tracking key stored by the mail registration server for the encrypted electronic message allows conversion of the intermediate key into the session key.

15. A method according to claim 14, wherein the intermediate key and said tracking key are binary numbers, and wherein recovery of said session key comprises performing a bitwise exclusive-OR operation on the intermediate key and said tracking key.

16. A method according to claim 13, wherein the mail registration server inhibits decryption of an electronic mail message prior to a specified time.

\* \* \* \* \*